United States Patent
Hammon (10) Patent No.: US 10,251,381 B1
(45) Date of Patent: Apr. 9, 2019

(54) METHOD OF CREATING EYE LOOP FOR ATTACHING LURES, FLIES, AND OTHER FISHING TACKLE TO FISHING LINE

(71) Applicant: Dominic Hammon, Brookings, OR (US)

(72) Inventor: Dominic Hammon, Brookings, OR (US)

( * ) Notice: Subject to any disclaimer, the term of this patent is extended or adjusted under 35 U.S.C. 154(b) by 467 days.

(21) Appl. No.: 15/042,294

(22) Filed: Feb. 12, 2016

(51) Int. Cl.
  *A01K 91/04* (2006.01)
(52) U.S. Cl.
  CPC .................................. *A01K 91/04* (2013.01)
(58) Field of Classification Search
  CPC ..................................................... A01K 91/04
  USPC .............................. 289/1.5, 17; 140/102, 104
  See application file for complete search history.

(56) References Cited

U.S. PATENT DOCUMENTS

| | | | | |
|---|---|---|---|---|
| 898,912 | A * | 9/1908 | Neller | B21F 15/04 140/104 |
| 2,006,355 | A * | 7/1935 | Howell | B21F 1/06 140/104 |
| 2,371,295 | A * | 3/1945 | Hopkins | A01K 91/03 24/601.8 |
| 2,492,690 | A * | 12/1949 | Diamond | A01K 91/04 24/115 A |
| 2,631,617 | A * | 3/1953 | Drayer | A01K 91/04 140/117 |
| 2,700,840 | A | 6/1953 | Butts | |
| 2,824,583 | A * | 2/1958 | Knoester | B21F 1/06 140/104 |
| 2,992,029 | A | 7/1961 | Russell | |
| 3,434,750 | A | 3/1969 | Hetrick | |
| 3,578,035 | A * | 5/1971 | Parker | B21F 1/06 140/102.5 |
| 3,750,240 | A * | 8/1973 | Fridrich | A01K 91/04 24/601.1 |
| 3,893,254 | A | 7/1975 | Nack | |
| 4,333,614 | A * | 6/1982 | Flax | A01K 97/26 242/446 |
| 4,423,757 | A * | 1/1984 | Broberg, Jr. | B21F 1/002 140/104 |
| 4,660,314 | A | 4/1987 | Janssen et al. | |
| 5,309,954 | A * | 5/1994 | Franssen | B25B 33/00 140/104 |
| 5,593,198 | A | 1/1997 | Vogel, II | |
| 5,603,181 | A * | 2/1997 | Abdul-Raheem | A01K 91/04 24/131 R |

(Continued)

*Primary Examiner* — Shaun R Hurley
*Assistant Examiner* — Bao-Thieu L Nguyen
(74) *Attorney, Agent, or Firm* — Jerry Haynes Law (57) ABSTRACT

A method of creating an eye loop can be done by use of a screwdriver, pliers, wire, and optionally a lure to be attached. The first step comprises bending wire around a screwdriver to create pre-eye loop shape/form wire and optionally inserting a distal end of wire into the lure or other fishing tackle that is desired to be attached to the fishing line. Then positioning the pre-eye loop shaped wire in the pliers so the distal (or tag line) end of the wire extends out the left side of the pliers and the proximal (or leader line) end of the wire extends out the rear end of the pliers. In the next step, simultaneously turning the pre-eye loop form and pliers in opposite directions, preferably ¼ turns at a time, and preferably up to 10 one-quarter turns to create the desired wire eye loop and optionally the wire is attached to the fishing line via the wire eye loop.

9 Claims, 6 Drawing Sheets

(56) References Cited

U.S. PATENT DOCUMENTS

| | | | |
|---|---|---|---|
| 5,781,972 A * | 7/1998 | Steed | A01K 91/04 |
| | | | 24/131 C |
| 5,829,798 A | 11/1998 | Little | |
| 6,185,858 B1 | 2/2001 | Choron | |
| 6,634,680 B1 | 10/2003 | Firestone | |
| 6,681,514 B1 | 1/2004 | Jursik | |
| 6,948,275 B1 * | 9/2005 | Lehmann | A01K 91/04 |
| | | | 24/908 |
| 7,032,627 B1 * | 4/2006 | Sheriff | B21F 1/002 |
| | | | 140/102.5 |
| 7,666,196 B1 | 2/2010 | Miles | |
| 8,511,721 B1 | 8/2013 | Farner et al. | |
| 9,883,663 B1 * | 2/2018 | Hammon | A01K 91/04 |
| 2013/0180160 A1 * | 7/2013 | Petherick | A01K 91/04 |
| | | | 43/43.1 |
| 2015/0313197 A1 * | 11/2015 | Leigh | A01K 83/00 |
| | | | 43/44.83 |

* cited by examiner

METHOD OF CREATING EYE LOOP FOR ATTACHING LURES, FLIES, AND OTHER FISHING TACKLE TO FISHING LINE

FIELD OF THE INVENTION

The present invention relates generally to a method of creating an eye loop for attaching lures, flies, and other fishing tackle to fishing line. More specifically it relates to a method of creating a wire eye loop for attaching lures, flies, and other fishing tackle to fishing line.

BACKGROUND OF THE INVENTION

Methods of creating eye loops for attaching lures, flies, and other fishing tackle to fishing line are often used to provide assistance in tying knots around an object, such as a fish hook or fishing fly. Typically, these devices are small handheld implements that have various geometric features around which a cord may be wound.

Several ways to create loops for attaching some type of fishing tackles to the fishing line have been developed. Generally fishing tackle is the equipment used by fishermen when fishing. Almost any equipment or gear used for fishing can be called fishing tackle; however gear that is attached to the end of a fishing line is called terminal tackle. This includes hooks, leaders, swivels, sinkers, floats, split rings and wire, snaps, beads, spoons, blades, spinners and devises to attach to the fishing line by tying knots or other attachment means.

Winding the loops for attaching fishing tackle to fishing line is often tedious and problematic. Usually the user must keep a finger on the windings to keep them from unraveling, overlapping, or getting tangled or a special device is used to tie knots or prepare the loops.

Numerous innovations for attaching lures, flies, and other fishing tackle to fishing line have been developed in the prior art as described below. Even though these innovations may be suitable for the specific purposes to which they address, they differ from the present invention.

For example, U.S. Pat. No. 7,666,196 to Miles discloses a specialized knot tying device comprising an inner rod with a longitudinal through-slot, a hollow cylinder with a longitudinal through-slot, and a cord winding cylinder with a longitudinal through-slot.

U.S. Pat. No. 6,185,858 to Choron describes a leader attachment tool that includes a bent wire member including a handle portion, a right angle offset portion, an axis portion, a connecting hook with a tapered insertion end, an attachment eyelet, and a plastic sleeve handle.

U.S. Pat. No. 2,992,029 to William and U.S. Pat. No. 6,634,680 to Firestone discloses hook snelling methods and devices comprising a flat plate-like key-shaped body.

U.S. Pat. No. 3,893,254 to Nack describes a fish hook snelling tool comprising a hollow bodied unit enclosing a band power or other resilient element that can be used to provide longitudinal tension and rotational torsion forces, wherein the longitudinal forces of the resilient element hold the fish hook engaged in a vise, and torsional forces of the resilient element provide a winding action to tie snelling knots or ties.

U.S. Pat. No. 5,829,798 to Little discloses a fishing knot-tying method and device, comprising a handle end including means for forming loops and a working end including a bifurcated pointed end tapering outwardly toward the handle and including upstanding edges to guide the line and a thumb pad to be used when holding the line.

U.S. Pat. No. 3,434,750 to Hetrick discloses a finger-held hook snelling device comprising a circular base portion with a center tab for gripping the device. The loop is then twisted and passed over the device to form the snell.

U.S. Pat. No. 2,700,840 to Butts describes a fish hook snelling device for attaching a snell to a fish hook having a shank portion and an eyelet at one end, a handle portion, means on the handle portion for gripping the shank of the fish hook and, a needle mounted by the said handle portion.

It is apparent now that numerous innovations for attaching lures, flies, and other fishing tackle to fishing line have been developed in the prior art that are adequate for various purposes. Even though these innovations may be suitable for the specific purposes to which they address, they would not be suitable for the purposes of the present invention as heretofore described. Thus a method of creating wire eye loop for attaching lures, flies, and other fishing tackle to fishing line without using a specialized device to create the desired eye loop is needed. Furthermore a straight forward method of the present invention allows a user to create the desired wired eye loop quickly and effectively.

SUMMARY OF THE INVENTION

The present invention discloses a method of creating wire eye loop for attaching lures, flies, and other fishing tackle to fishing line.

According to the present invention the method of creating an eye loop can be done by using of a screwdriver, pliers, wire and optionally a lure to be attached. Wherein the first step includes bending a distal end of a wire around a screwdriver to create pre-eye loop shape/form wire and optionally inserting the distal end of wire into the lure or other fishing tackle that is desired to be attached to the fishing line. Then, positioning the pre-eye loop shaped wire in the pliers so the distal (or tag line) end of the wire extends out the left side of the pliers and the proximal (or leader line) end of the wire extends out the rear end of the pliers. In the next step, simultaneously turning the pre-eye loop form and pliers in opposite directions, preferably ¼ turns at a time, and preferably up to 10 one-quarter turns to create the desired wire eye loop and optionally the wire is attached to the fishing line via the wire eye loop. Thereafter the desired wire eye loop can be completed to provide an efficient tie.

In accordance with one aspect of the present invention, a method of creating an eye loop for attaching lures, flies, and other fishing tackle to fishing line includes bending a distal end of a wire to create pre-eye loop shaped wire at the distal end of the wire; inserting the distal end of wire into the lure or other fishing tackle that is desired to be attached to the fishing line; positioning the pre-eye loop shaped wire in a gripping tool, so the distal end of the wire extends out the left side of the gripping tool and proximal end of the wire extends out the rear end of the gripping tool; and turning the pre-eye loop shape by the gripping tool with respect to the extended wire one-quarter turns at a time, and turned multiple one-quarter turns to create the desired wire eye loop.

It is another aspect of the present invention is to provide a method of creating a wire eye loop for attaching lures, flies, and other fishing tackle to fishing line by using a screwdriver and a pair of pliers comprising, bending a distal end of the wire around the screwdriver shank to create pre-eye loop shaped wire at the distal end of the wire; inserting the distal end of wire into the lure or other fishing tackle that is desired to be attached to the fishing line; positioning the pre-eye loop shaped wire in the pliers, so the distal end of the wire extends out the left side of the pliers and proximal end of the wire extends out the rear end of the pliers; and turning the pre-eye loop shape by the pliers with respect to the extended wire one-quarter turns at a time, and turning the pre-eye loop preferably up to 10 one-quarter turns to create the desired wire eye loop.

It is an object of the present invention is to provide a method of creating an eye loop for attaching lures, flies, and other fishing tackle to fishing line, wherein the wire can be made from iron or steel or galvanized iron or any type of metal to withstand at least a 50 kg load.

It is another object of the present invention to provide a method of creating an eye loop for attaching lures, flies, and other fishing tackle to fishing line by using common and simple tools such as a screwdriver and a pair of pliers, which are sufficient to create the desired eye loop.

It is another object of the present invention is to create a desired eye loop by using a metal wire so as to catch and hold larger fish.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIGS. 1-6. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A method of creating wire eye loop 100 for attaching lures, flies, and other fishing tackle 114 to fishing line is described in FIGS. 1-6. The method uses no special device to create the desired eye loop 100 for attaching the fishing tackle 114 to the fishing line. Further the eye loop 100 is created by using metal wires 102 so as to hold larger objects such as big fishes or other aquatic animals without breakage of the eye loop 100. The method of creating eye loop 100 can be done by use of common equipment like a screwdriver 104, pliers 116, wire 102 and optionally a lure 114 to be attached. Wherein the first step comprises bending the wire 102 around the screwdriver shank 105 to create pre-eye loop 106 shape/form of wire 102 and optionally insert distal end of wire 102 into the lure or other fishing tackle 114 that is desired to be attached to the fishing line. Then positioning the pre-eye loop 106 shaped wire in the pliers 116 so the distal (or tag line) end 108 of the wire 102 extends out the left side of the pliers 116 and the proximal (or leader line) end 112 of the wire 102 extends out the rear end of the pliers 116. In the next step, simultaneously turning the pre-eye loop form 106 and pliers 116 in opposite directions, preferably one quarter turns at a time, and preferably up to ten one-quarter turns to create the desired wire eye loop 100 and optionally the wire 102 is attached to the fishing line via the wire eye loop 100.

Figure 1:
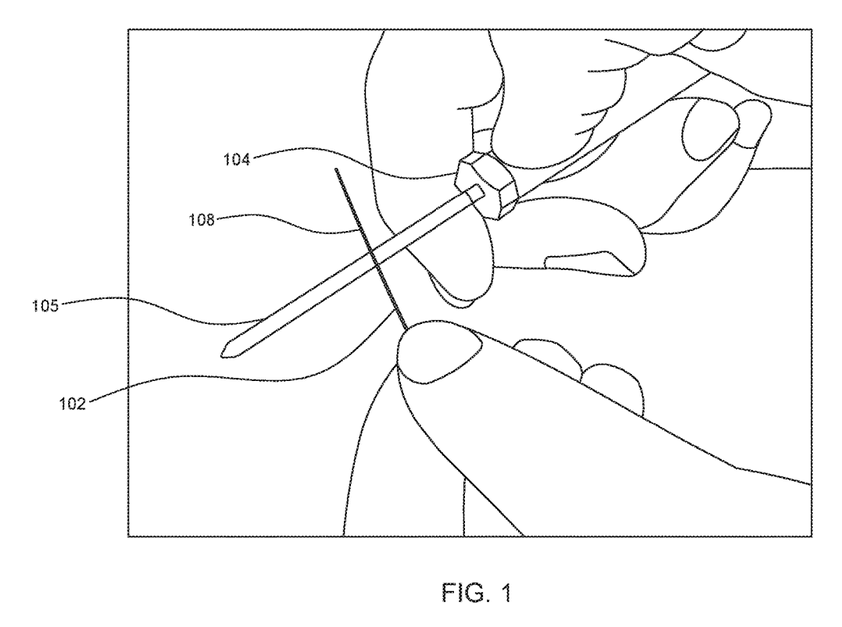
FIG. 1 illustrates an exemplary step of positioning a wire on a shank of a screwdriver for creating an eye loop.

As referenced in FIG. 1, the first step of the method comprises positioning a wire 102 on a shank 105 of a screwdriver 104 for creating an eye loop 100. One end of the wire 108 is extended 110 approximately one inch over the shank 105 of the screwdriver 104 or any such devices, wherein the extended part 110 of the wire at one end 108 is intended to be bent for creating the desired eye loop 100. The wire 102 material can be of any metal having corrosion resistant property, high elasticity, ductile and having high malleability so that one end 108 of it can be easily turned into a loop and having high load bearing capability and durability in aqueous environment, such as the wire 102 can be made from aluminum or steel or galvanized iron or cupper or any type of metal and having sufficient diameter to withstand at least 50 kg load while enough malleable to be turned to create the desired eye loop 100.

Figure 2:
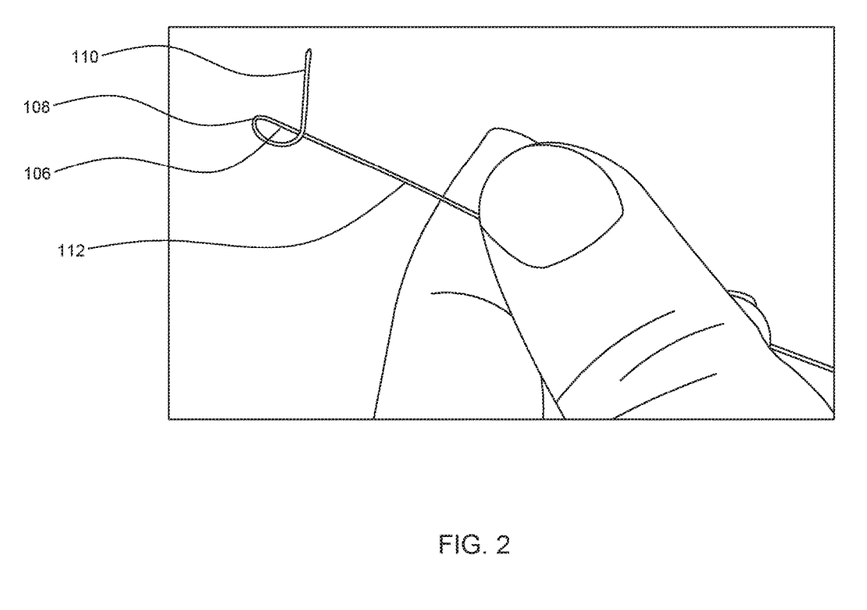
FIG. 2 illustrates an exemplary step of bending the wire on a shank of a screwdriver for creating the eye loop.

Turning now to FIG. 2, wherein the FIG. 2 shows the next step of bending the wire 102 on a shank 105 of a screwdriver 104 to create a shape to form a pre-eye loop 106, wherein a lure or other fishing tackle 114 that is desired to be attached to the fishing line can be optionally inserted into pre-eye loop 106 at the one end of the wire 102.

Figure 3:
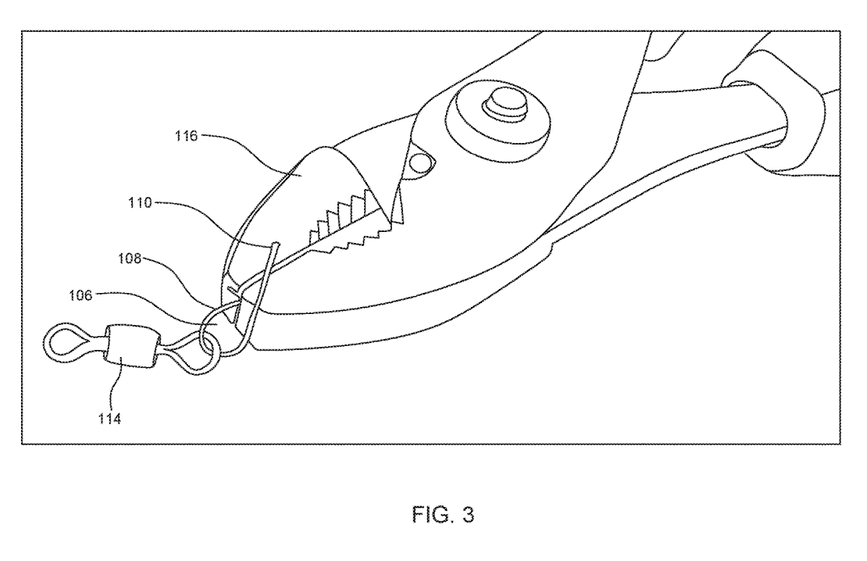
FIG. 3 illustrates an exemplary step of positioning the pre-eye loop shaped wire in a pair of pliers and inserting a lure into the pre-eye loop.

FIG. 3 illustrates an exemplary method of positioning the pre-eye loop shaped wire 106 in the pliers 116 so the distal (or tag line) end 108 of the wire 102 extends out of the left side of the pliers 116 and the proximal (or leader line) end 112 of the wire 102 extends out of the rear end of the pliers 116 while the lure 114 is inserted into pre-eye loop 106 of the wire 102. However other type of fishing tackle can be inserted into the pre-eye loop shape 106 of the wire 102. A part of the wire extends out 110 of the pre-eye loop 106, which is intended to be turned around the other part the wire 112, so that the lure or the other fishing tackle 114 can be fixedly attached to the loop 100.

Figure 4:
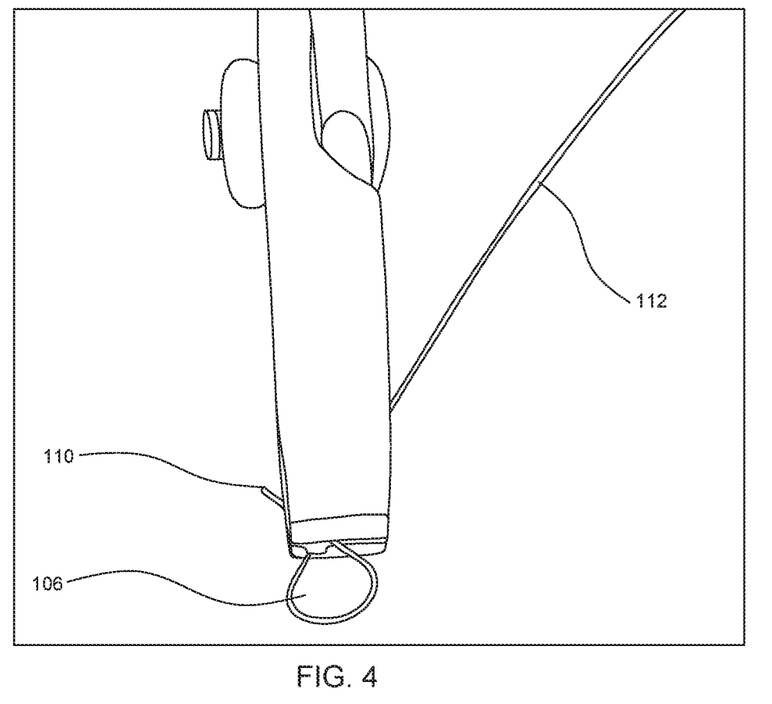
FIG. 4 illustrates an exemplary method of simultaneously turning the pre-eye loop form and pliers in opposite directions.

FIG. 4 illustrates an exemplary method of simultaneously turning the pre-eye loop form 106 and pliers 116 in opposite directions, preferably one quarter turns at a time, and preferably up to ten one-quarter turns to create the desired wire eye loop 100, however turning the extended portion 110 of the pre-eye loop 106 by any suitable turns at a time and sufficient number of times, so that the eye loop 100 does not slip to open position during its use.

Figure 5:
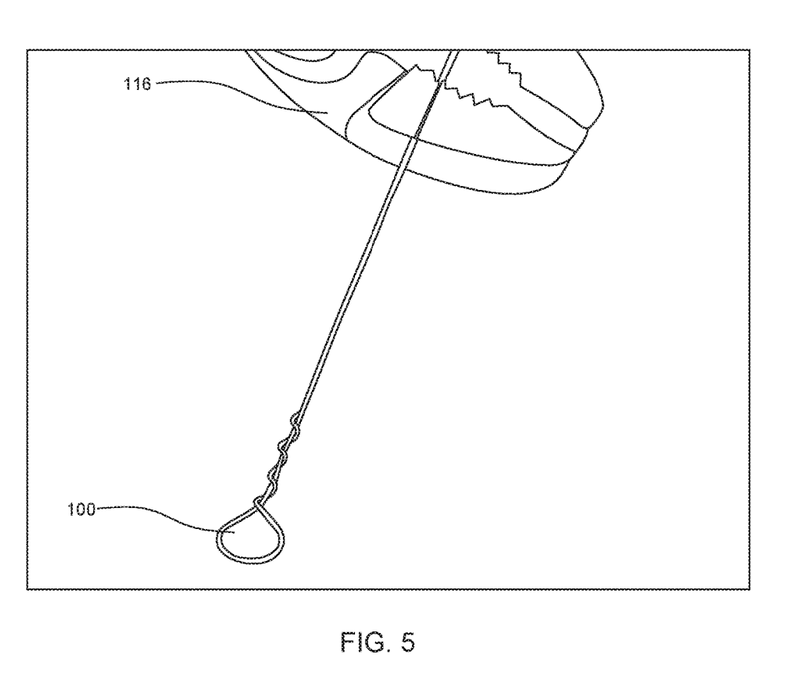
FIG. 5 illustrates an exemplary formation of the eye loop at one end of the wire.
Figure 6:
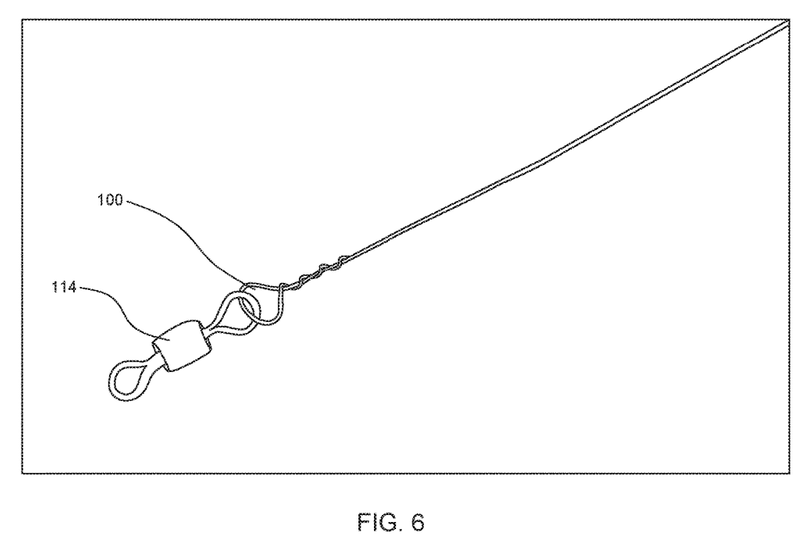
FIG. 6 illustrates an exemplary attachment of the wire eye loop to the fishing line or lure.

FIG. 5 illustrates an exemplary formation of the eye loop 100 at one end of the wire 108, wherein the loop 100 is strong enough to hold larger objects as compared to the traditional eye loops and also it requires very less time to create the loop 100. FIG. 6 illustrates an exemplary attachment of the wire eye loop 100 to the fishing line or lure 114.

In one aspect of the present invention, a method of creating eye loop 100 for attaching lures, flies, and other fishing tackle 114 to fishing line comprising, bending distal end 108 of a wire 102 to create pre-eye loop shaped wire 106 at the distal end 108 of the wire 102; inserting distal end 108 of wire 102 into the lure or other fishing tackle 114 that is desired to be attached to the fishing line; positioning the pre-eye loop shaped wire 106 in a gripping tool 116, so the distal end of the wire 108 extends out 110 the left side of the gripping tool 116 and the proximal end of the wire 112 extends out the rear end of the gripping tool 116; and turning the pre-eye loop shape 106 by the gripping tool 116 with respect to the extended wire 110 one-quarter turns at a time, and turned multiple one-quarter turns to create the desired wire eye loop 100. Wherein the gripping tools may be a pair of pliers or the like.

It is another aspect of the present invention is to provide a method of creating a wire eye loop 100 for attaching lures, flies, and other fishing tackle 114 to fishing line by using a screwdriver 104 and a pair of pliers 116 comprising, bending distal end 108 of a wire 102 around the screwdriver shank 105 to create pre-eye loop shaped wire 106 at the distal end 108 of the wire 102; inserting distal end 108 of wire 102 into the lure or other fishing tackle 114 that is desired to be attached to the fishing line; positioning the pre-eye loop shaped wire 106 in the pliers 116, so the distal end 108 of the wire 102 extends out the left side of the pliers 116 and the proximal end 112 of the wire 102 extends out the rear end of the pliers 116; and turning the pre-eye loop shape 106 by the pliers 116 with respect to the extended wire 110 one-quarter turns at a time, and turning the pre-eye loop 106 preferably up to 10 one-quarter turns to create the desired wire eye loop 100.

In another aspect, the method of creating eye loop 100 for attaching lures, flies, and other fishing tackle 114 to fishing line, wherein the wire 102 is made of iron or steel or galvanized iron or any type of metal to withstand at least 50 kg load.

In another aspect, the method is used for creating eye loop 100 for attaching lures, flies, and other fishing tackle 114 to fishing line by using common and simple tools like a piece of wire 102, a screwdriver 104 and a pair of pliers 116, which are sufficient to create the desired eye loop 100.

In another aspect, the method is used to create a desired eye loop 100 by using a metal wire 102 so as to catch larger fishes.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What I claim is:

1. A method of creating an eye loop for attaching lures to fishing line comprising:
    bending a distal end of a wire by crossing the wire over itself to create a pre-eye loop at the distal end of the wire;
    inserting the distal end of wire into the lure that is to be attached to the fishing line;
    positioning the wire in a gripping tool by engagement of the gripping tool with the wire adjacent to the pre-eye loop, the distal end of the wire extends out a side of the gripping tool and the proximal end of the wire extends out an end of the gripping tool;
    turning the wire by the gripping tool with respect to the wire one-quarter turn; and
    continue turning the wire multiple one-quarter turns to create the wire eye loop.

2. The method of claim 1, wherein the wire comprises a material capable of withstanding at least a 50 kg load.

3. The method of claim 1, wherein the wire comprises iron, steel or galvanized iron.

4. The method of claim 1, wherein bending of the wire comprises bending around a screwdriver shank.

5. The method of claim 1, wherein the gripping tool comprises a pair of pliers.

6. The method of claim 1, wherein the wire is turned up to ten one-quarter turns to create the wire eye loop.

7. A method of creating a wire eye loop for attaching lures to fishing line by using a screwdriver and a pair of pliers comprising:
    bending the distal end of a wire around a shank of the screwdriver to cross the wire over itself and create a pre-eye loop at the distal end of the wire;
    inserting the distal end of the wire into the lure that is to be attached to the fishing line;
    positioning the wire in a gripping tool by engagement of the gripping tool with the wire adjacent to the pre-eye loop, the distal end of the wire extends out a side of the gripping tool and the proximal end of the wire extends out an end of the gripping tool; and
    turning the wire with the pliers with respect to the wire one-quarter turn, and turning the wire preferably up to ten one-quarter turns to create the wire eye loop.

8. The method of claim 7, wherein the wire comprises a material capable of withstanding at least a 50 kg load.

9. The method of claim 8, wherein the wire comprises iron, steel or galvanized iron.

* * * * *